United States Patent
Detlefs

(10) Patent No.: US 7,499,961 B2
(45) Date of Patent: Mar. 3, 2009

(54) METHOD AND APPARATUS FOR LIMITING THE SIZE AND FACILITATING MAINTENANCE OF REMEMBERED SETS IN A SPACE INCREMENTAL GARBAGE COLLECTOR

(75) Inventor: David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 252 days.

(21) Appl. No.: 11/330,777

(22) Filed: Jan. 12, 2006

(65) Prior Publication Data
US 2007/0174369 A1   Jul. 26, 2007

(51) Int. Cl.
*G06F 17/30* (2006.01)
*G06F 17/00* (2006.01)
(52) U.S. Cl. .................... 707/206; 711/170; 711/173
(58) Field of Classification Search ............... 707/206; 711/170, 173
See application file for complete search history.

(56) References Cited

U.S. PATENT DOCUMENTS

| 6,434,577 B1 | 8/2002 | Garthwaite |
| 6,449,626 B1 | 9/2002 | Garthwaite et al. |
| 2004/0193662 A1* | 9/2004 | Garthwaite ............. 707/206 |

OTHER PUBLICATIONS

Detlefs et al., "Concurrent Remembered Set Refinement in Generational Garbage Collection", Proceedings of the 2nd Java™ Virtual Machine Research and Technology Symposium, p. 13-26, Aug. 1-2, 2002.*
Fitzgerald et al., "The Case For Profile-Directed Selection of Garbage Collectors", Proceedings of the 2nd international symposium on Memory management, p. 111-120, Oct. 15-16, 2000, Minneapolis, Minnesota, United States.*
Seligmann et al., Incremental Mature Garbage Collection Using the Train Algorithm, Proceedings of the 9th European Conference on Object-Oriented Programming, p. 235-252, Aug. 7-11, 1995.*
Detlefs, D., Flood, C., Heller, S., Printezis, T., "Garbage-First Garbage Collection", ISMM'04, Oct. 24-25, 2004, Vancouver, British Columbia, Canada, 12 pages.
Printezis, T., Garthwaite, A., "Visualising The Train Garbage Collector", ISMM '02, Jun. 20-21, 2002, Berlin, Germany, 14 pages.
Sachindran, N., Moss, J., Berger, E., "MC2: High-Performance Garbage Collection for Memory-Constrained Environments", 2001, 16 pages.

* cited by examiner

*Primary Examiner*—Tony Mahmoudi
*Assistant Examiner*—Nicholas F Woronko
(74) *Attorney, Agent, or Firm*—Osha • Liang LLP

(57) ABSTRACT

In a space incremental garbage collector, remembered set information for a region is stored in a set of fixed-size data structures, each of which has a representation of the information and a level of precision that differs from other data structures in the set. Remembered set information for each other region is placed in a data structure based on the density of inter-region references between the region and the other region. The remembered set information for the other region is moved from one data structure to another data structure when the density of inter-region references between the region and the other changes. Some of the data structures use bit arrays to store the information and these arrays can be combined with bit arrays produced by the collector to facilitate the identification and removal of stale remembered set entries.

10 Claims, 9 Drawing Sheets

METHOD AND APPARATUS FOR LIMITING THE SIZE AND FACILITATING MAINTENANCE OF REMEMBERED SETS IN A SPACE INCREMENTAL GARBAGE COLLECTOR

BACKGROUND

This invention relates to automatic reclamation of allocated, but unused memory, or garbage, in a computer system that uses a space-incremental garbage collector to process an object space. Modern programming languages like the Java™ programming language or C# allow the use of automatic memory reclamation, or "garbage collection", which relieves programmers of the burden of explicitly freeing, or de-allocating, storage allocated to objects when the objects are no longer used, or reachable, by the application program. Memory reclamation may be carried out by a special-purpose garbage collection algorithm that locates and reclaims dynamically assigned memory (called "heap" memory) that is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal application thread processing must be suspended during the garbage collection process and these collectors at least occasionally scan the entire heap memory. For example, many modern applications have large live data sets, sometimes measured in gigabytes. Even on fast modern processors, collecting the entire heap in one atomic operation can take several seconds. Some applications require only minimizing the total garbage collection overhead and may be able to tolerate such delays. Other applications will tolerate significant garbage collection overhead, if the total garbage collection delay is broken into a series of smaller delays and each individual delay is small enough that it does not unduly delay individual operations of the application. For example, real-time or interactive systems where non-disruptive behavior is of greatest importance generally cannot use techniques which collect the entire heap in one operation and, thus, cause considerable disruption.

Several conventional techniques are typically used to alleviate long garbage collection delays. In accordance with one such technique, some portion of the collection process occurs concurrently with the operation of the application program. For example, on a multiprocessor system, one processor might perform garbage collection while another processor concurrently executed the application. While concurrent operation works well for some collection tasks, it is more difficult to use with others. In particular, it is often desirable for a garbage collector to perform "compaction." More specifically, if a portion of a garbage-collected heap contains a mix of reachable and unreachable objects, then even if the unreachable objects are identified and made available for re-allocation, it may be difficult to allocate new objects in the free space because it is fragmented into many relatively small non-contiguous pieces. Compaction moves the reachable objects together, creating larger contiguous areas of reachable objects and free space, which enables easier allocation of new objects. A common compaction method is to move or "evacuate" all the reachable objects in a sub-region of the heap memory to another, smaller, contiguous portion of the heap, making the evacuated region entirely free space.

Another solution for limiting pause times is to use a space incremental garbage collector. In such a collector, heap memory is divided into a set of equal-sized "regions". Some process (perhaps a concurrent marking process) identifies reachable and unreachable objects. Then collection may be accomplished by selecting regions (often regions containing few reachable and many unreachable objects) for evacuation, and evacuating their reachable objects. A few such regions can be evacuated at a time, breaking up a large disruptive collection operation into a number of smaller, less disruptive collection operations. In addition, these collectors automatically compact the heap regions that are collected since all reachable objects are copied to a contiguous region of the heap memory. Examples of space-incremental collectors include the Mature Object Space (or "Train") collector disclosed in "Incremental Garbage Collection for Mature Objects", R. L. Hudson and J. E. B. Moss, *Proceedings of the International Workshop on Memory Management*, v. 637 of Lecture Notes in Computer Science, pp. 388-403, University of Massachusetts, USA, Sep. 16-18, 1992. Springer-Verlag., the $MC^2$ collector described in "$MC^2$: High-performance Garbage Collection for Memory-constrained Environments", N. Sachindran, J. E. B. Moss and E.D. Berger, *Proceedings of the $19^{th}$ Annual ACM SIGPLAN Conference on Object-oriented Programming, Systems, Languages and Applications*, pp. 81-98, Vancouver BC, Canada, 2004, ACM Press, New York, N.Y. and the Garbage-First garbage collector described in general in "Garbage-First Garbage Collection", D. Detlefs, C. Flood, S. Heller and A. Printezis, *Proceedings of the 4th international symposium on Memory management*, pp. 37-48, Vancouver, BC, Canada 2004.

Since space incremental collectors move reachable objects from one memory region to another, other objects located outside of a region being collected that contain pointers to the objects being moved must also be identified so that the pointers can be updated to refer the new locations of the moved objects. One conventional mechanism for identifying these other objects is to use a "remembered set" for each region. A remembered set is a data structure associated with a region containing information that identifies all objects outside of that region that might contain pointers to objects inside that region. During collection, the remembered set data structure is scanned to locate the other objects. The aforementioned space-incremental collectors all use remembered set data structures to enable space-incremental collection.

However, remembered sets can present their own problems. One problem is maintenance of the remembered sets by both the collector and the application program. Remembered sets are typically updated by the collector during a collection. A write barrier is used to intercept pointer modifications made by the application program and to update the appropriate remembered set when each modification is made. The overhead imposed by such a write barrier on the application program can be substantial and, therefore, known methods are used to reduce this overhead. One such method is to use "card marking." In this technique, the heap memory is partitioned into "card" areas of equal size and a card table maintains a bit for each card area. Whenever, an application program modifies an object located within a heap region represented by a card area, it marks that card area as "dirty in the card table. Although each pointer modification must still be intercepted by a write barrier, in most systems, the cost of updating the card table is much less then updating the remembered set. Later, during a collection, the collector uses the card table to locate dirty card areas and then scans those areas to locate the inter-generational pointers and update the remembered sets.

Another problem with remembered sets is that, in some situations, the remembered set data structures can grow very large, consuming memory space that could be better utilized holding user data. The conventional solution to this problem is to trade space for precision. In accordance with this solution, when a remembered set grows too large, its representation is "coarsened" so that fewer bits of remembered set information represent a larger region of the heap that might contain relevant pointers. Collection of a region whose remembered set data structure has been coarsened in this way is more expensive, since larger heap portions represented by the remembered set information must be scanned to find pointers into the region being collected. For example, a more fine-grained remembered set representation might have represented small portions of heap memory in which pointers into the region being collected occurred densely, whereas the more coarse-grained representation represents large portions of the heap in which pointers into the region being collected occur sparsely.

This additional collection expense can be a considerable problem in a garbage collector like the aforementioned Garbage-First garbage collector that maintains a detailed model of collection costs, including remembered set scanning costs, in an attempt to perform collections that reliably fit within a user-specified time limit. More specifically, if a remembered set data structure is coarsened, the associated region may be too expensive to collect.

SUMMARY

In accordance with the principles of the invention, remembered set information for a region is stored in a set of fixed-size data structures, each of which has a representation of the information and a level of precision that differs from other data structures in the set. Remembered set information for each other region is placed in a data structure based on the density of inter-region references between the region and the other region.

In one embodiment, remembered set information for the other region is moved from one data structure to another data structure when the density of inter-region references between the region and the other changes.

In another embodiment, information to be entered into the remembered set for another region is first entered into the data structure with the highest level of precision. When that level fills, further information for that other region is then entered into a data structure with the next highest level of precision. When the latter data structure fills the information for that other region is transferred to the data structure with the next highest level of precision. Since each of the data structures has a fixed size, the overall size of the remembered set is bounded.

In still another embodiment, there are three data structures in the hierarchy, a sparse data structure, a fine data structure and a coarse data structure. The sparse data structure contains an entry for each referring region and the entry contains a fixed number of card identifiers for that region. The fine data structure also contains a fixed number of entries for referring regions and each such entry contains a bit array with a bit for each card in the region represented. The coarse data structure contains a bit for each referring region.

In yet another embodiment, the multiple data structure remembered set efficiently supports a remembered set "scrubbing" process, which identifies and removes stale remembered set entries, thus reducing the size of remembered sets and the expense of collecting regions. The inventive scrubbing process involves selected bit array intersections of the remembered set bit arrays with bit arrays produced during a marking process carried out during a collection.

DETAILED DESCRIPTION

Figure 1:
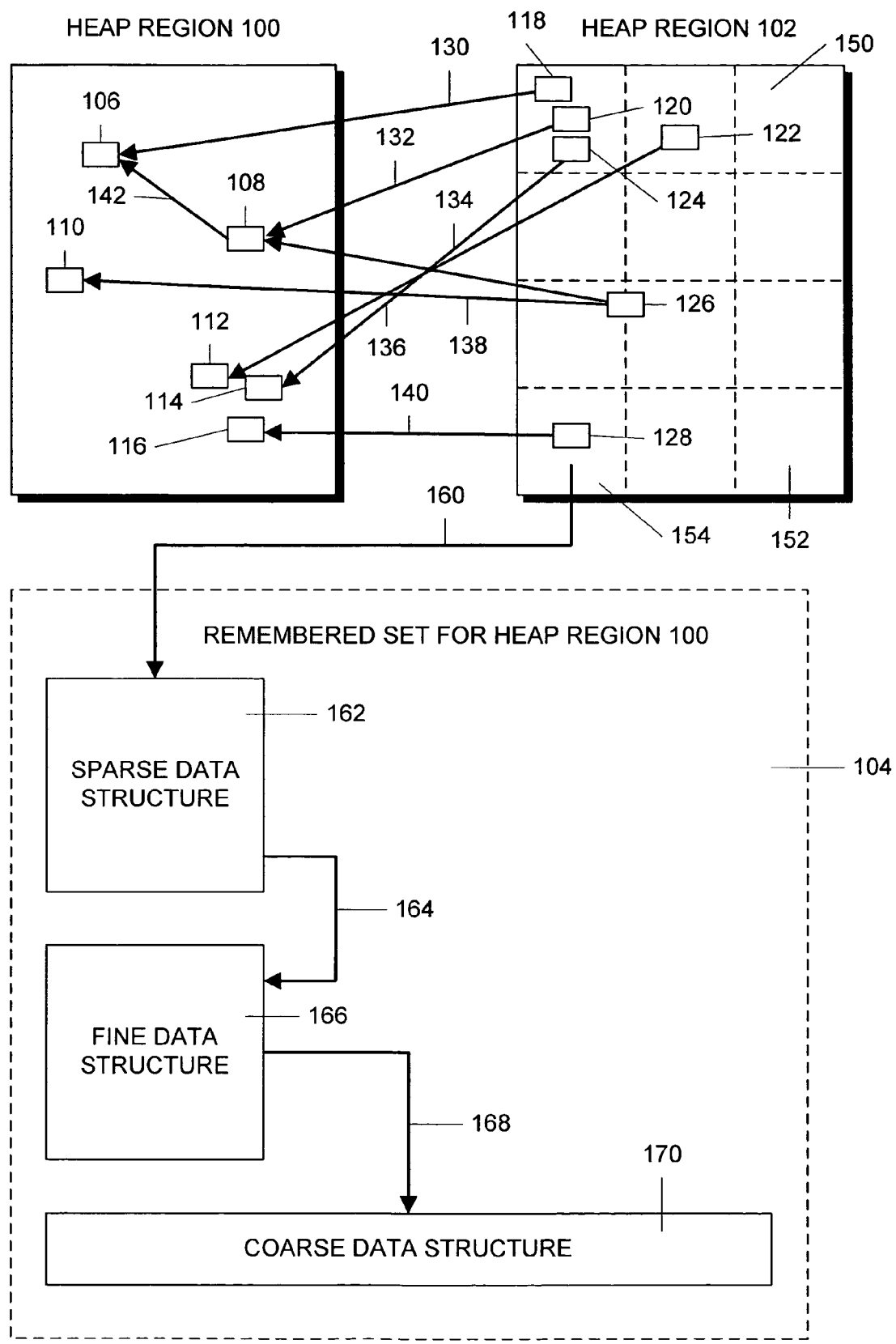
FIG. 1 is a block schematic diagram illustrating how inter-region reference information for one heap region is stored in the remembered set of another heap region.

FIG. 1 illustrates two heap memory regions 100 and 102. The size and location of these regions would be determined by the particular collector in use. As discussed above, for each region 100 to be collected, the collector maintains a remembered set 104 that contains information concerning objects in other regions that refer to objects in region 100. For example, region 102 contains objects, of which objects 118-128 are shown. These objects contain references to objects 106-116 in region 100 as indicated by arrows 130-140. In addition, of course, objects in a region may also refer to other objects in that region as illustrated by arrow 142.

The heap is conceptually divided into small equal-sized memory areas called "cards." The size of the cards depends again on the collector. A typical size of a card is 512 bytes. FIG. 1 shows heap region 102 conceptually divided into a plurality of cards, for example, cards 150,152 and 154 whose boundaries are illustrated as dotted lines. The cards are selected so that region boundaries will also be card boundaries as illustrated in FIG. 1. Although only twelve cards are shown, typically the number of cards in a region would be much higher. Cards represent the smallest "granularity" of information recorded in each remembered set. Thus, for example, each remembered set for region 100 will designate sets of cards in other regions outside of region 100 that contain objects with pointers to objects in region 100. The remembered set for a region, such as region 100, is organized by card sets contained in other regions. For example, all cards in region 102 will be kept together in the inventive remembered set 104 for region 100.

Objects, such as object 126, may span a card boundary, but the heap maintains conventional mechanisms that identify the start of the first object that extends onto a given card, and, given the location of an object, find the start of the next object. These mechanisms allow a card to be "parsed" in a known manner to locate the objects in the heap area represented by the card and then to scan the located object contents for pointers.

In accordance with the principles of the invention, each remembered set 104 comprises a plurality of data structures that represent multiple levels of representation, wherein the levels have different space versus precision tradeoffs. In one embodiment, these levels are maintained in three data structures 162, 166 and 170, which are described in detail below. In the first level, a "sparse" data structure 162 records information that identifies cards in referring regions, such as region 102, wherein the density of inter-region pointers is low, that is region 102 contains only a small number of pointers into region 100. For example, the information identifying card 154 might be entered into sparse data structure 162 as indicated by arrow 160. Later, the identified cards will be parsed, as described above, to locate the pointers.

As mentioned above, each of the data structures 162, 166 and 170 has a fixed size, so that as the density of inter-region pointers increases, the sparse data structure 162 may become filled with card information identifying cards in a particular region. Once the data structure becomes filled, if information for a new card must be stored, a new entry is made in the "fine" data structure 166 as schematically illustrated by arrow 164. The fine data structure 166 also maintains information identifying cards that represent memory areas that may contain pointers into region 100, but the bit array representation is more efficient than the representation used in the sparse data structure 162 when there are large numbers of cards to represent.

Since the fine data structure 166 also has a fixed size, it is possible that it may also fill with data for multiple referring regions. If this happens, the information for one region is removed from the data structure 166 and an entry is made in the coarse data structure 170 as indicated by arrow 168 for the removed entry. A new entry can then be created for an additional referring region. The coarse data structure 170 maintains information identifying regions that contain cards, which, in turn, may contain pointers into region 100. Since only regions are identified, the information is still more compact compared to the information in the sparse data structure 162 and the fine data structure 162. However, considerable additional work must be done by the collector in scanning the entire region to locate the pointers.

Figure 2:
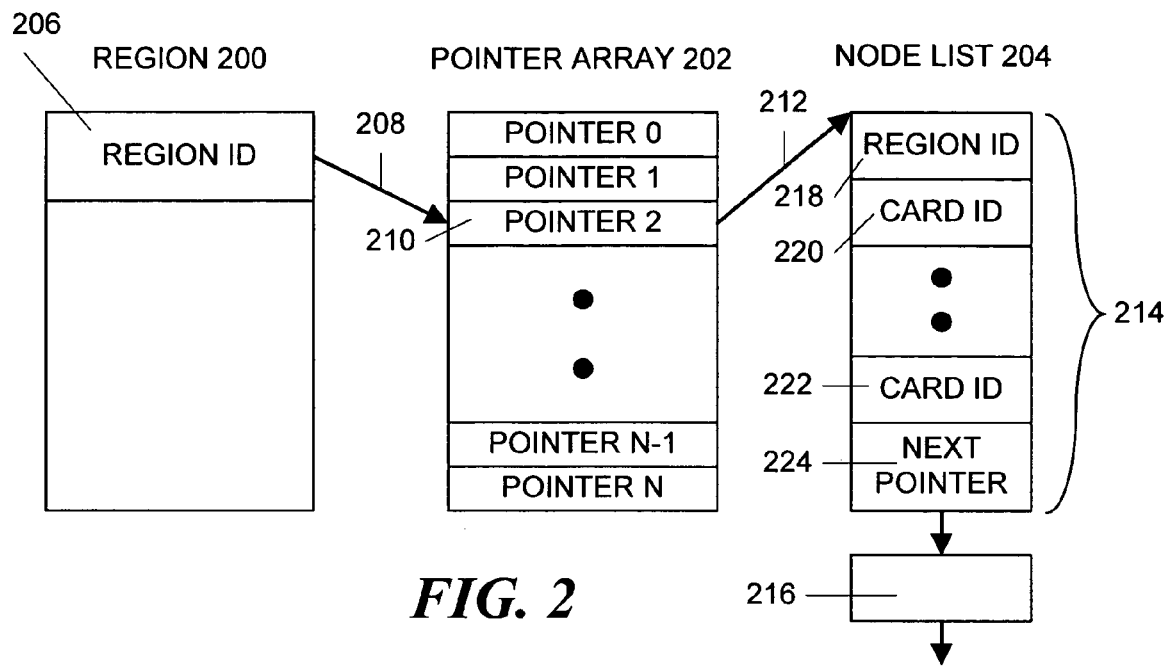
FIG. 2 is a block schematic diagram that shows an illustrative implementation for a sparse remembered set data structure.

FIG. 2 shows an illustrative implementation of the sparse data structure 162. In a typical implementation, a region size of 1 MB is often selected for the collector, so that 16 bits will generally suffice to uniquely identify all regions in the entire heap, and also to identify all cards within a region. With this understanding, the sparse data structure 162 can be represented as an "open" (or "bucket-list") hash table as shown in FIG. 2. In this implementation, a region identifier is processed by a conventional hashing algorithm to generate an index into an array containing 16-bit pointers to "nodes" in a linked node list. For example, the region identifier 206 for region 200 is processed to generate an index into a pointer array 202 as indicated by arrow 208. The selected entry 210 contains a 16-bit pointer that points, as indicated by arrow 212, to the first node, such as node 214, of a linked node list 204.

Each node, such as node 214, contains the identifier 218 of the region to which it corresponds, a 16-bit next pointer 224 to a next node 216 in the list whose region identifier hashes to the same array index, and up to a predetermined number (called SPARSE_LIM) of "slots" for identifiers of cards within the region 200, of which card identifier slots 220 and 222 are shown. A typical choice of six for SPARSE_LIM will allow up to six cards to be identified in 16*6=96 bits plus 32 bits for the region identifier and the next pointer =128 bits, or 16 bytes. Each node has the same internal structure so that only node 214 is shown in detail for clarity.

Figure 3:
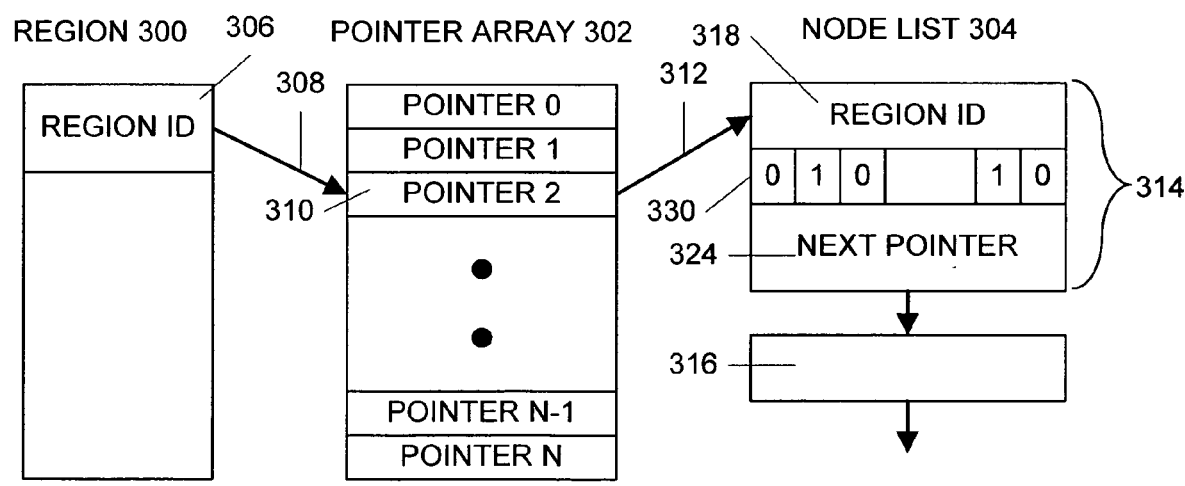
FIG. 3 is a block schematic diagram that shows an illustrative implementation for a fine remembered set data structure.

When the number of cards from a referring region, such as region 200, exceeds the predetermined limit, SPARSE_LIM, as mentioned above, an entry is created for region 200 in a second "fine" data structure. In one implementation, the sparse data structure 166 can also be represented as an "open" (or "bucket-list") hash table as shown in FIG. 3. In FIG. 3, elements that correspond to elements in FIG. 2 have been given corresponding element designations. For example, region 200 corresponds to region 300. In this implementation, a region identifier is processed by a conventional hashing algorithm to generate an index into an array containing 16-bit pointers to "nodes" in a linked node list. For example, the region identifier 306 for region 300 is processed to generate an index into a pointer array 302 as indicated by arrow 308. The selected entry 310 contains a 16-bit pointer that points, as indicated by arrow 312, to the first node, such as node 314, of a linked node list 304.

Each node, such as node 314, contains the identifier 318 of the region to which it corresponds, a 16-bit next pointer 324 to a next node 316 in the list whose region identifier hashes to the same array index. The identification of referring cards is accomplished by using a bit array 330, where each bit in the array corresponds to a card in region 300, and indicates whether that card may possibly contain pointers into the region under consideration. If, as described above 1 MB heap regions and 512 byte cards are used, there are 2048 cards in a region, so the bitmap must be of length 2048 bits, or 256 bytes. Therefore, the fine data structure allows representation of up to 2048 cards in about 256 bytes (ignoring here a constant extra overhead for the node list structure containing the bitmap, typically another 32 bytes). This is a significantly better ratio than six cards in 16 bytes, but only if a sufficiently large fraction of the cards are in the set.

Figure 4:
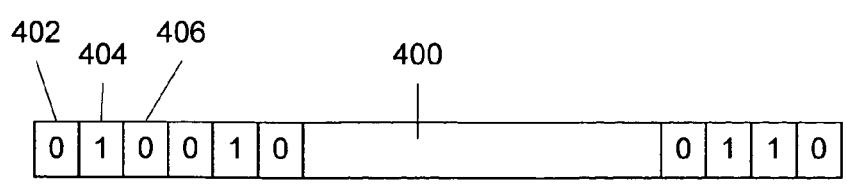
FIG. 4 is a block schematic diagram that shows an illustrative implementation for a coarse remembered set data structure.

However, if each region in a 1 GB (1024 region) heap used an entry in the fine data structure to store information for cards in every other region, the fine data structure could have a worst-case size of about 256 MB, a unacceptably large space overhead. Therefore, the number of fine data structure entries that any region may maintain for other referring regions is arbitrarily limited to a predetermined number (called FINE_LIMIT). In general, FINE_LIMIT will be considerably less than the number of regions in the heap and could be determined by a user-specified upper bound on the allowable remembered set space overhead. If a region already has already created FINE_LIMIT entries in the fine data structure, and encounters another region with card information that cannot be entered in the sparse data structure because there are already SPARSE_LIMIT entries for that region in that data structure, then some region is chosen for eviction from the fine data structure to make room for the new region. This eviction process surveys the current entries of the fine data structure (perhaps using a sampling technique) to find a candidate entry with relatively high "occupancy" (number of set bits in the card bitmap). The candidate is removed from the fine data structure and an entry is made for the corresponding region in the last level of the remembered set representation, the "coarse" data structure shown in FIG. 4.

Each region has associated with it such a coarse data structure. In one implementation, each coarse data structure is a bit array 400 with one bit (for example, bits 402, 404 and 406) for every other region. If, in this. bit array 400, the bit for a region is set, that entire region is considered to possibly contain pointers into the region with which the data structure 400 is associated. Obviously, this is a very space-efficient representation, but a region associated with a coarse data structure having several bits set for referring regions would be quite expensive to collect, since the collection requires scanning each of those referring regions in its entirety for pointers.

Figure 5A:
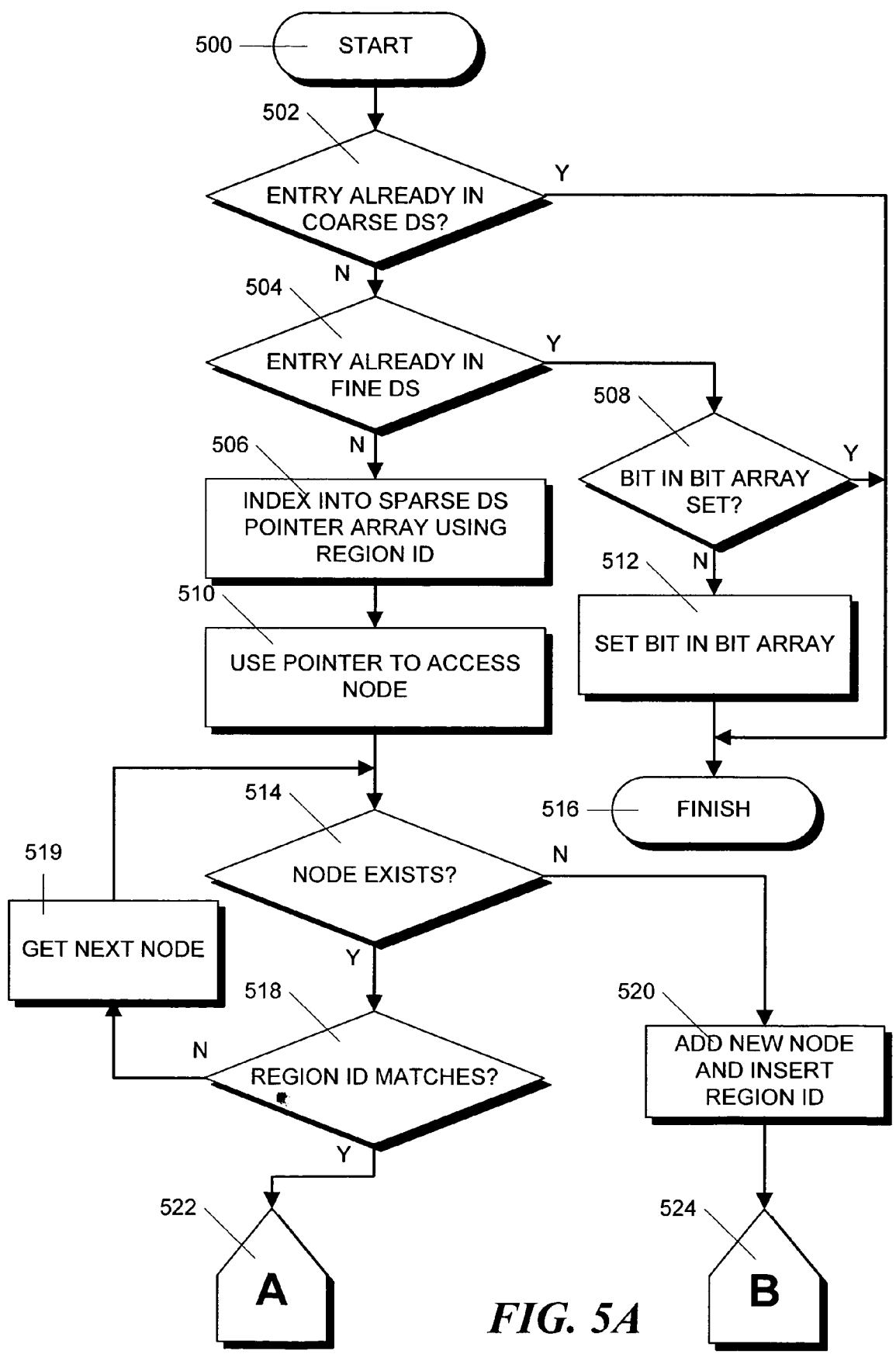
FIGS. 5A-5C, when placed together, form a flowchart showing the steps in an illustrative process for adding card information to a remembered set constructed in accordance with the principles of the invention.
Figure 5B:
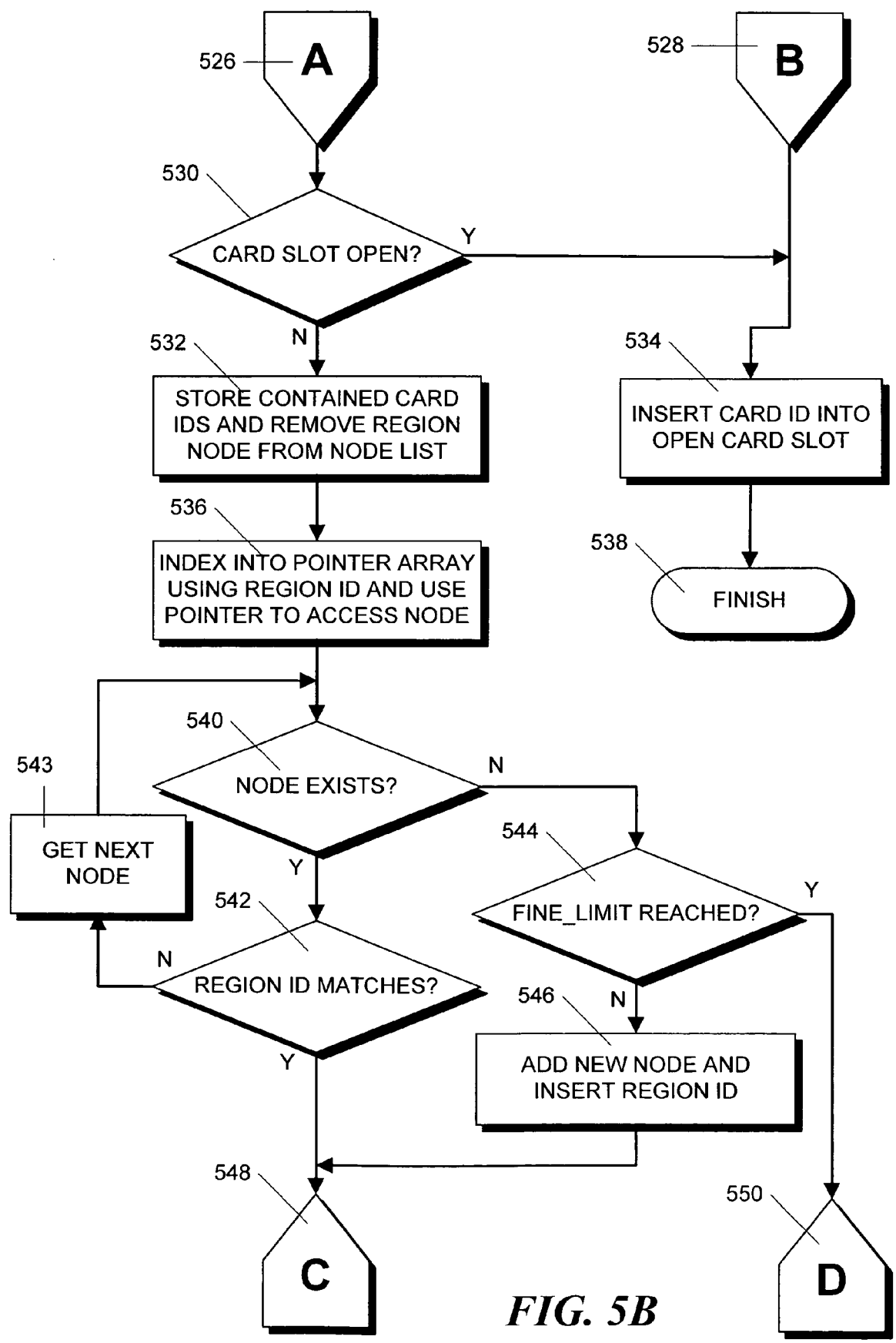
Figure 5C:
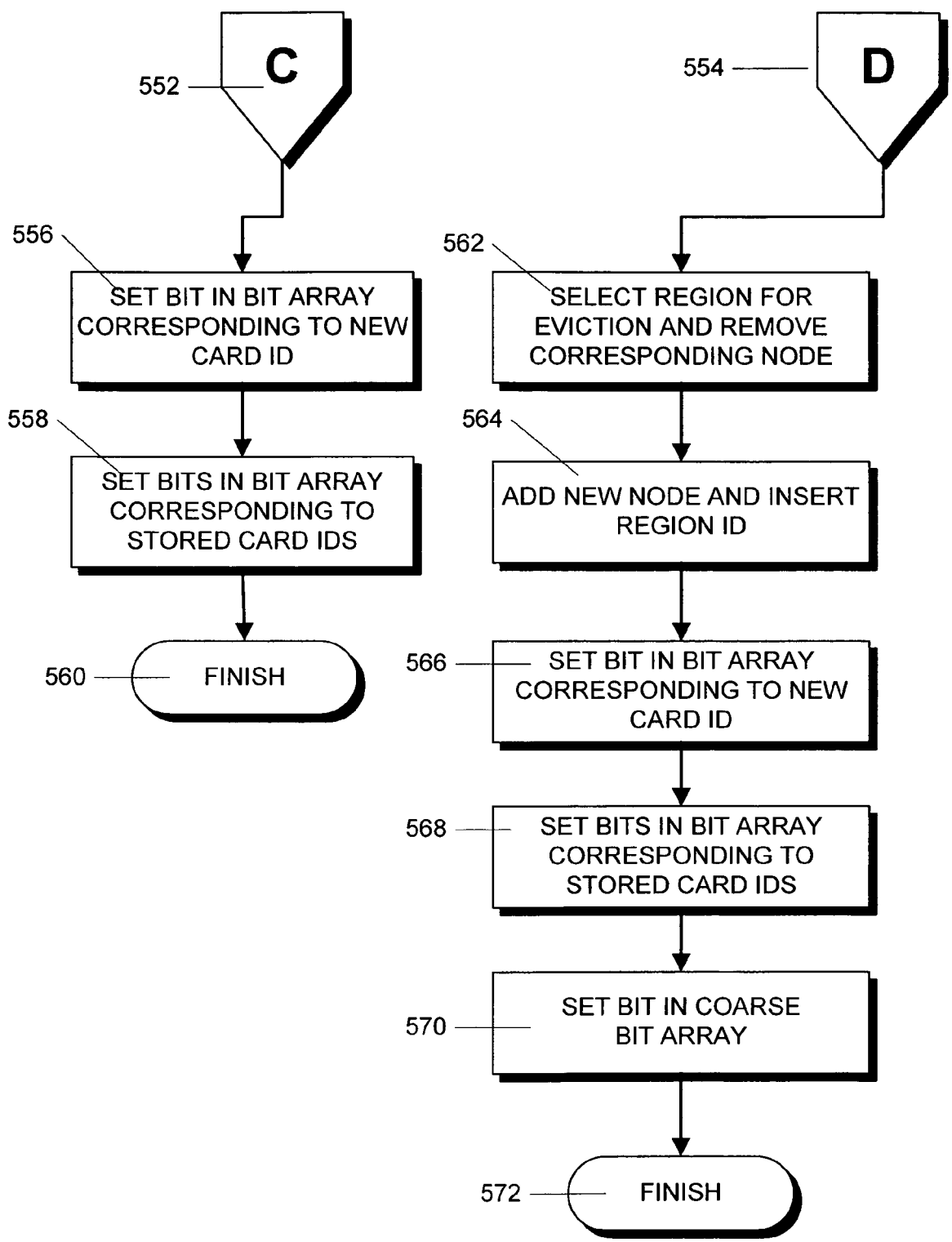

The process of updating a remembered set to add card information for a region is shown in detail in FIGS. 5A-5C. This process begins in step 500 and proceeds to step 502 where a determination is made whether there is already an entry for the region containing the card in the coarse data structure of the remembered set. If an entry for the region is present, then the card is already implicitly represented in the remembered set, since a coarse data structure bit represents all cards of the corresponding region, and the process therefore finishes in step 516. However, if, in step 502, it is determined that no entry presently exists in the coarse data structure, then, in step 504, a determination is made whether an entry for that region already exists in the fine data structure for the remembered set. If an entry for that region exists, then a determination is made in step 508 whether the bit corresponding to the card is already set. If so, an entry for that card already exists in the remembered set and the process finishes in step 516. If the bit in the bit is not set, then, in step 512, the appropriate bit is set and the process finishes in step 516.

Alternatively, if in step 504, it is determined that no entry already exists in the fine data structure of the remembered set, then, in step 506, the identifier for that region is hashed to create an index into the pointer array 202 of the sparse data structure. The pointer at the indexed location is then retrieved from the array 202 and used to access the first node in a node list in step 510.

In step 514, a determination is made whether node information exists at the location indicated by the pointer. If not, a new node is created at the location to which the pointer points and the identifier for the region is inserted in step 520. The process then proceeds, via off-page connectors 524 and 528, to step 534 where a card identifier is inserted into an open card ID slot and the process finishes in step 538.

However, if it is determined at step 514 that node information exists at the location to which the pointer points, then, in step 518, a check is made to determine whether the node information is for the current region. This check is made by determining whether the region identifier stored in the node matches the region identifier for which information is to be entered. If the region identifiers do not match, indicating that the node contains information for another region, then the process proceeds to step 519 where the next node in the node list is obtained. The next node can be obtained by following the next pointer, if any, in the node to the next node. If no next node exists, as determined in step 514, a new node is created and linked to the list in step 520 and the card identifier is added in step 534. The process then finishes in step 538.

However, if, in step 518, a node is encountered that contains information for the current region, as indicated by a matching region identifier, the process proceeds, via off-page connectors 522 and 526, to step 530 where a determination is made whether a slot for a card identifier is open. If so, the card identifier is inserted into the open slot in step 534 and the process finishes in step 538. However, if all slots for card identifiers for the region have already been filled, as determined in step 530, the sparse data structure is full. In this case, in step 532, the node corresponding to the region is removed from the sparse data structure by unlinking the node in a conventional fashion. However, any card identifiers contained in this node are temporarily stored so that corresponding information can be entered into the fine data structure as described below. In step 536, the identifier for the current region is hashed to create an index into the pointer array 302 of the fine data structure and the pointer at the indexed location is then retrieved from the array 302 and used to access the first node in a node list.

In step 540, a determination is made whether node information exists at the location indicated by the pointer. If not, the process proceeds to step 544 where a determination is made whether the predetermined limit for fine data structure entries has been reached for the current region. If not, a new node is created at the location to which the pointer points and the identifier for the region is inserted in step 546. Then, the process proceeds, via off-page connectors 548 and 552, to step 556 where a bit is set in the bit array 330 to identify the new card that is being entered. In step 558, bits are also set in the bit array corresponding to any card identifiers stored in step 532 and the process finishes in step 560.

However, if it is determined at step 540 that node information exists at the location to which the pointer points, then, in step 542, a check is made to determine whether the node information is for the current region. This check is made by determining whether the region identifier stored in the node matches the region identifier for which information is to be entered. If the region identifiers do not match, indicating that the node contains information for another region, then the process proceeds to step 543 where the next node in the node list is obtained. The next node is obtained by following the next pointer, if any, in the node to the next node. If no next node exists, as determined in step 540, and the FINE_LIMIT has not been reached, as determined in step 544, a new node is created and linked to the list in step 546, a bit identifying the card is set in step 556 and bits identifying any stored card identifiers are set in step 558. The process then finishes in step 560.

If, in step 542, a node is encountered that contains information for the current region, as indicated by a matching region identifier, the process proceeds, via off-page connectors 548 and 552, to steps 556 and 558 where card identifying bits are set and the process finishes in step 560.

If a new fine data structure entry cannot be created because the predetermined fine data structure limit (FINE_LIMIT) has been reached, as determined in step 544, the process proceeds, via off-page connectors 550 and 554, to step 562 where a fine data structure entry corresponding either to the current region, or some other region, is selected for eviction using the criteria discussed above and the corresponding node is removed. In step 564, a new node is created for the current region and linked to the node list, if necessary. In step 566, a bit identifying the new card to be entered is set in the bit array in the newly-created node and, in step 568, bits identifying any card identifiers previously stored in step 532 are set in the bit array. Then, in step 570, a bit is set in the coarse bit array that corresponds to the region recently evicted from the fine data structure. The process then finishes in step 572.

The aforementioned hierarchy of remembered set levels allows a good tradeoff between precision and space overhead. In addition, it also facilitates remembered set maintenance, in particular, remembered set "scrubbing" or the removal of stale remembered set entries. As previously mentioned, at regular intervals, the collector examines modified cards for pointers that cross region boundaries, recording the source card information in the remembered set of the destination region. However, once recorded, card information may become stale because the object containing the referring pointer becomes unreachable. In order to reduce the size of the remembered set, it is desirable to remove stale entries, preferably without scanning the entire remembered set.

The mechanism for determining whether objects are unreachable depends on the collector that is in use. In the discussion below, the Garbage-First garbage collector is used as an example; however, those skilled in the art would understand that the principles of the invention apply to other types of collectors as well. In the Garbage-First collector, stale references can be located in two ways. First, when a region is evacuated during a collection, all objects that are not copied out of the region during the evacuation become unreachable. If some of these unreachable objects contain pointers recorded in remembered sets, those references become stale. To track these stale references, each region maintains an "outgoing" remembered set, indicating which other regions have recorded information of cards of that region in their remembered sets. In one embodiment, this outgoing remembered set can be represented as a bitmap as shown in FIG. 6, much like the coarse data structure described above.

Figure 6:
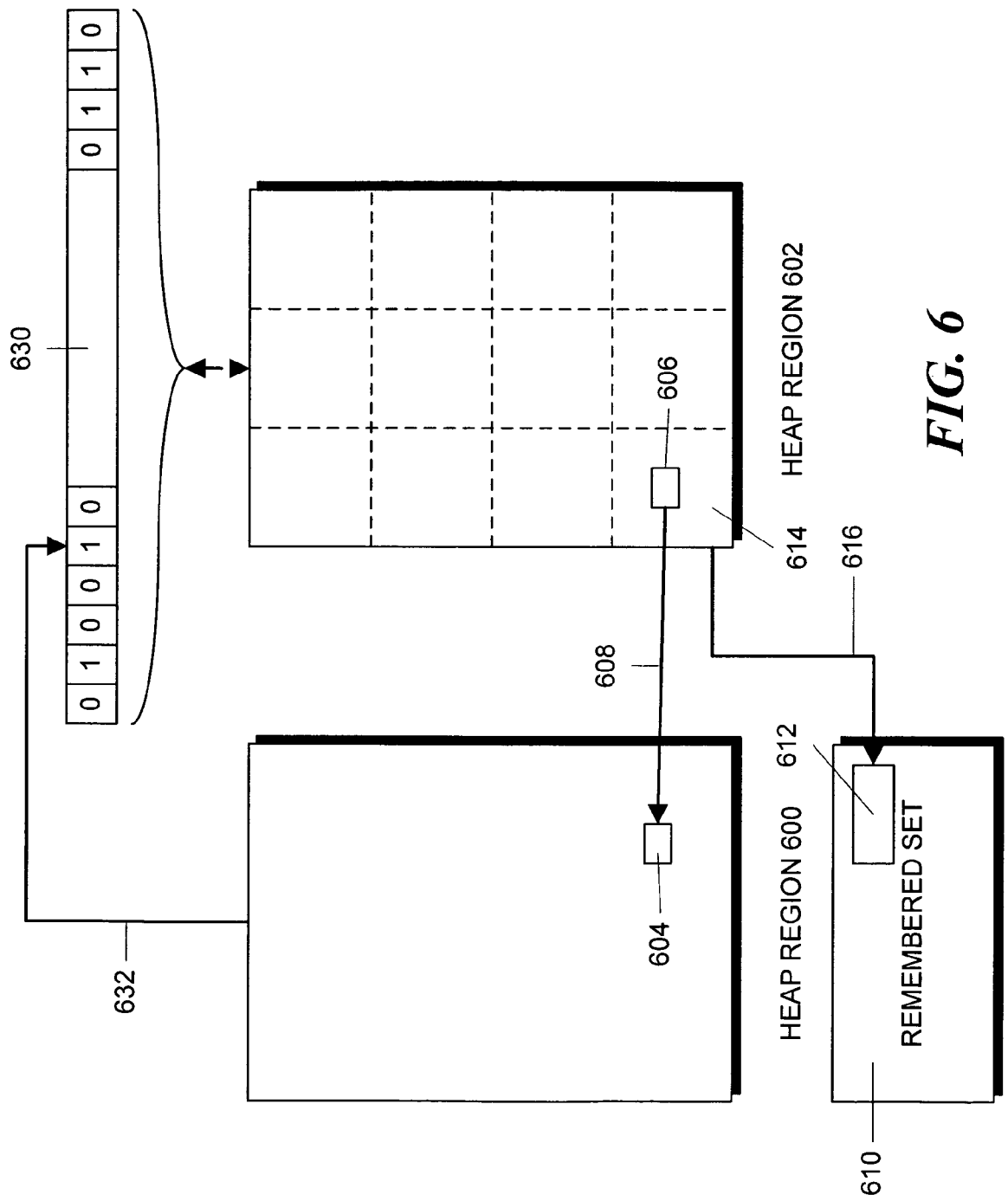
FIG. 6 is a block schematic diagram that illustrates how an outgoing remembered set for a region stores information regarding other regions whose remembered sets contain card information from that region.

In FIG. 6, heap region 600 includes an object 604 that is referenced by an object 606 in heap region 602 as indicated schematically by arrow 608. Thus, as described above, the remembered set 610 associated with heap region 600 will contain an entry for card 614 in heap region 602 that contains the object 606. Accordingly, the outgoing remembered set 630 of heap region 602 will have a bit that corresponds to heap region 600 set as indicated schematically by arrow 632.

When a region is evacuated, the outgoing remembered set of that region allows an enumeration of all the other regions containing card information that is recorded in the remembered set of the evacuated region. Since the references on those cards are now stale, for each such other region, information for all cards recorded for the evacuated region can be deleted. For example, if region 602 is evacuated, then its outgoing remembered set 630 indicates that region 600 has a card entry 612 in its remembered set 610 that is stale and can be deleted. However, evacuated live objects must still be examined for cross-region pointers and, if found, these are inserted into the appropriate remembered sets.

The second method of finding stale references in the Garbage-first garbage collector is via marking. In particular, the Garbage-First garbage collector uses a concurrent marking technique to perform marking while the application program executes. This marking process produces a bit array, with one bit for every heap location that might be the start of an object. A common constraint in garbage-collected systems is that objects must begin on 8-byte boundaries so that this latter bit array includes one bit for every 8 bytes (64 bits) of heap memory, resulting in a space overhead ratio for each marking bit array of 1/64.)

In accordance with the principles of the invention, to enable remembered set scrubbing, in addition to this marking bitmap, two smaller bit arrays are created during the marking process. The first of these bit arrays, called a "marking card bit array" has one bit for every card in the heap memory and, thus, a space overhead ratio of 1/4096 for 512-byte cards. The marking process is altered to ensure that, at the end of the process, a bit for a card is marked if any pointer field of a live object might be in the memory area associated with that card.

The second additional bit array, called a "marking region bit array" has one bit for every heap region, for a negligible space overhead ratio of 1 part in 8 million for 1 MB regions. The marking process is also altered so that a bit is set in this array if the corresponding region might contain any live pointers. Obviously, if bits are not set in these latter two bit arrays, the corresponding card or region contains no live pointers, and need not appear in any remembered sets.

Figure 7:
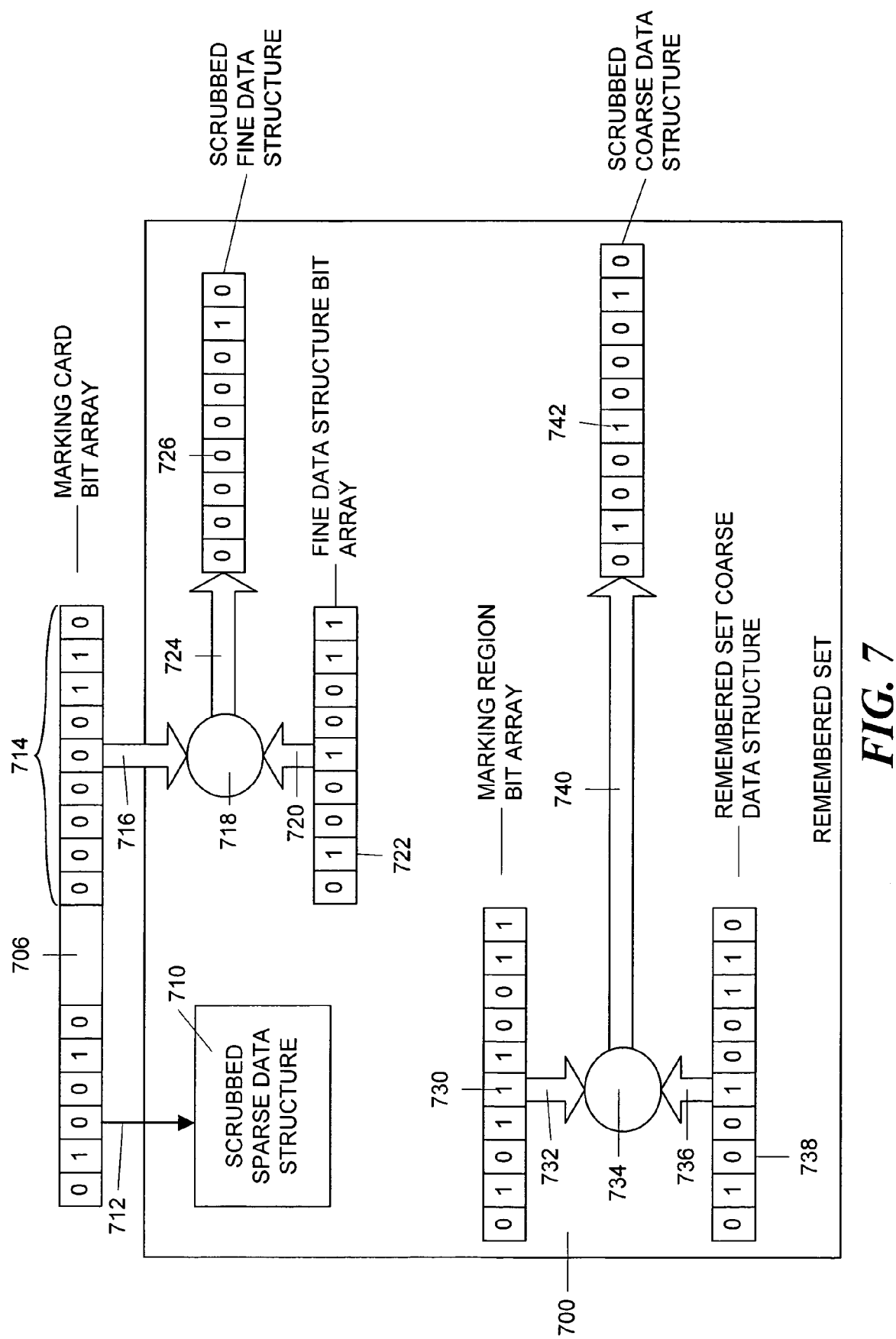
FIG. 7 is a block schematic diagram illustrating how remembered sets are scrubbed to eliminate stale entries in accordance with the principles of the invention.
Figure 8A:
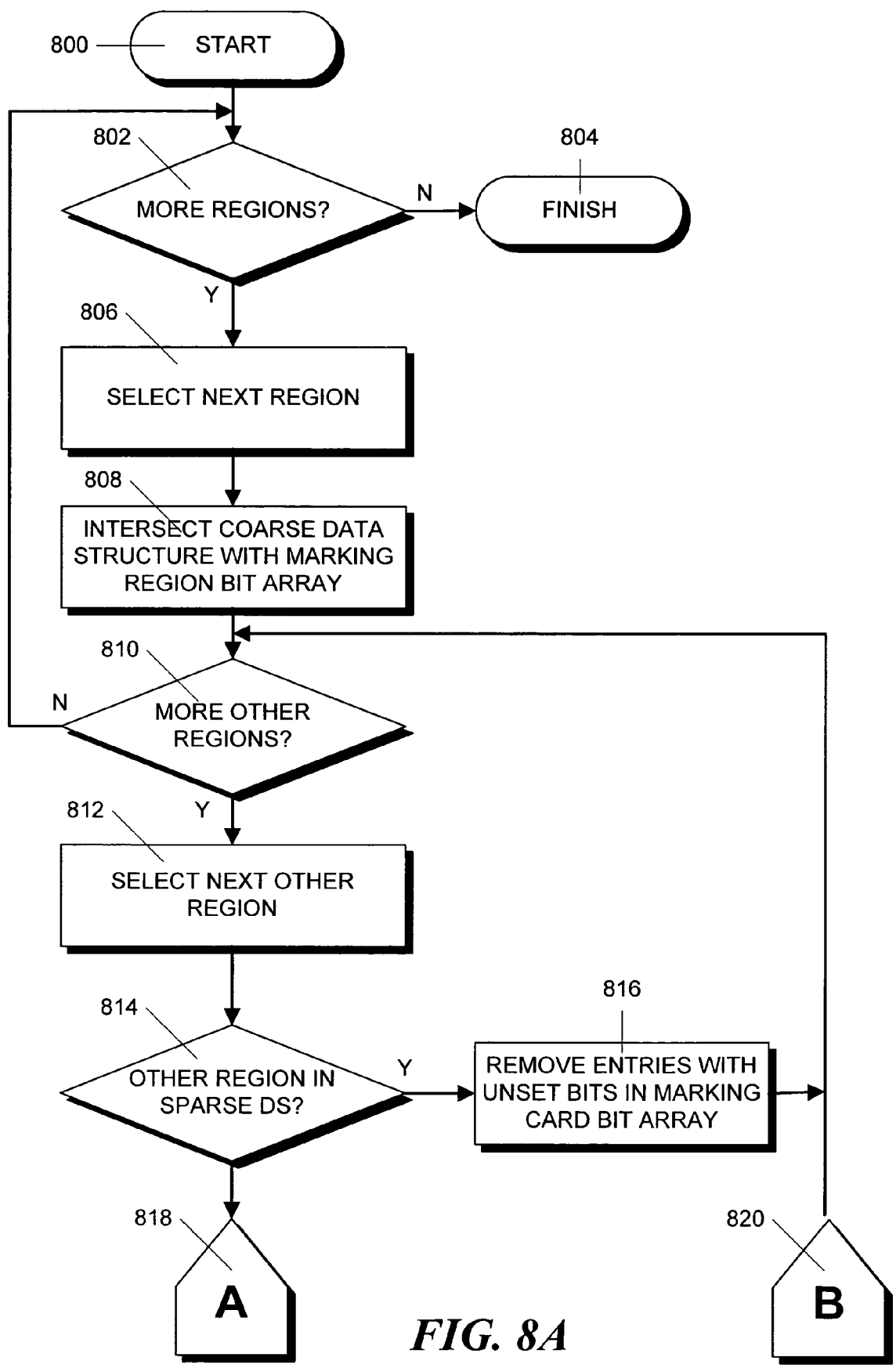
FIGS. 8A and 8B, when placed together, form a flowchart showing the steps in an illustrative process for scrubbing a remembered set.
Figure 8B:
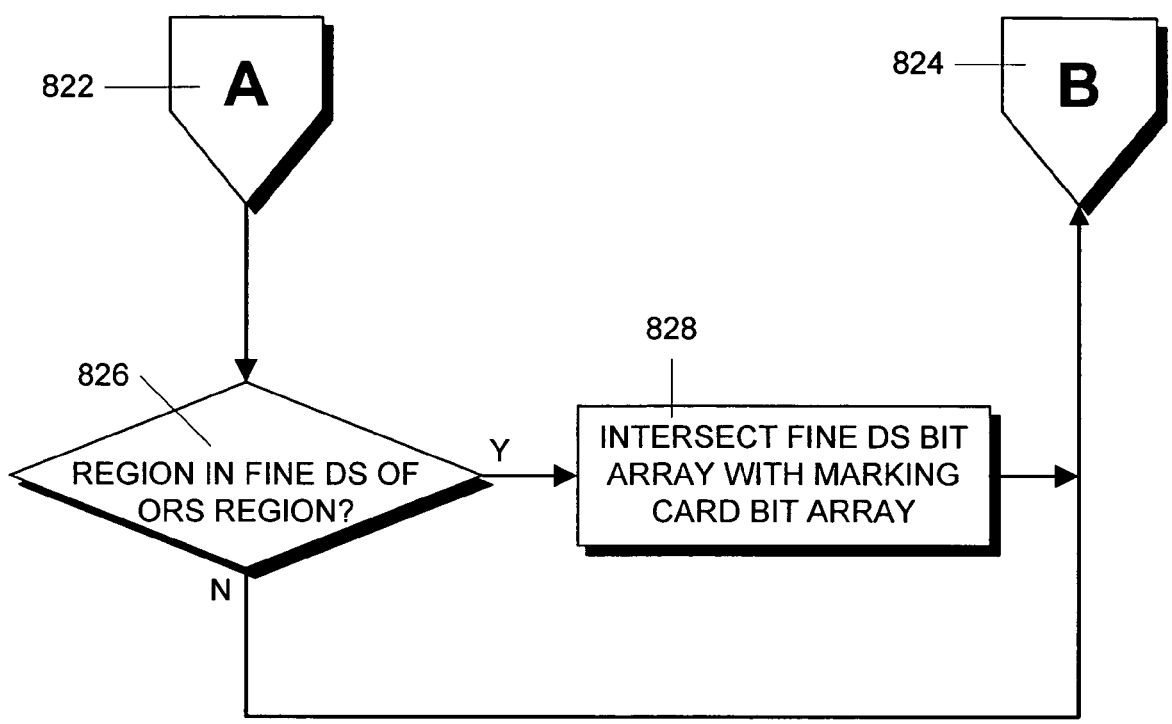

When a marking phase of the collector concludes, and these bitmaps are all accurate, remembered set scrubbing can be performed in accordance with the principles of the invention. This process is illustrated schematically in FIG. 7 and the steps are shown in FIG. 8. Each region is processed in turn. The process begins in step 800 and proceeds to step 802 where a determination is made whether further regions remain to be processed. If not, the process finishes in step 804. However, if further regions remain to be processed, the next region to be processed is selected in step 806. The remembered set 700 for the selected region is then located.

As discussed above in detail, information from cards in the other regions is stored in the sparse, fine, or coarse data structures in the remembered set 700 of the selected region. In step 808, the coarse table 738 of the remembered set 700 of the selected region is scrubbed by intersecting it with the marking region bit array 730 as indicated schematically by arrow 732, 736 and 740 and intersect operator 734. Both the coarse data structure 738 and the marking region bit array 730 are bit arrays with one bit per region in the heap. If any region recorded in one or more coarse data structures has become completely empty of live pointers, this intersection operation will remove that region from the coarse data structure to produce a scrubbed coarse data structure 742.

The remembered set must then be scrubbed for each other region that might have card information stored in the sparse data structure 710 or the fine data structure 722 of the remembered set 700 for the selected region. In step 810 a determination is made whether all other regions have been processed. If not, in step 812, the next other region to be processed is selected. In step 814, a determination is made whether the selected other region has any entries in the sparse data structure 710. If so, in step 816, any card entry for the selected other region whose bit in the marking card bit array 706 is not set is removed as indicated schematically by arrow 712. The process then returns to step 810 to determine whether additional other regions remain to be processed. If no further other regions remain to be processed, then the process then returns to step 802 to determine whether further regions, and their remembered sets, remain to be processed. If not, the process finishes in step 804.

Alternatively, if, in step 814, it is determined that the selected other region is not in the sparse data structure of the selected region, then the process proceeds, via off-page connectors 818 and 822 to step 826. In step 826, a determination is made whether the selected other region has card information in the fine data structure of the selected region. If so, in step 828, the bit array 722 in the fine data structure is intersected with the portion 714 of the marking card bit array 706 that corresponds to the selected other region. This operation is illustrated schematically by arrows 716, 720 and 724 and operator 718. The result is the scrubbed fine data structure 726. The process then proceeds, via off-page connectors 824 and 820, back to step 810 to determine whether any additional other regions remain to be processed.

The use of bit array intersection for the majority of operations in the inventive remembered set scrubbing process allows the scrubbing to be accomplished quickly. This process is also highly parallelizable because the marking bit arrays are only read, and scrubbing of one remembered set is independent of scrubbing of another remembered set. In addition, scrubbing could be performed concurrently with the operation of the application program as long as (a) scrubbing is performed before further allocation in a region invalidates its marking bit maps, and (b) removal of elements via scrubbing is synchronized with addition of elements for new pointers.

A software implementation of the above-described embodiment may comprise a series of computer instructions fixed on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. The order of the process steps may also be changed without affecting the operation of the invention. Other aspects, such as the specific process flow, as well as other modifications to the inventive concept are intended to be covered by the appended claims.

What is claimed is:

1. A computer implemented method, comprising:
    structuring a remembered set data structure for a plurality of referring heap memory regions of a heap memory region of the computer, the remembered set data structure having a plurality of fixed-size data structures, each of the plurality of fixed-size data structures having a representation of information stored therein and a level of precision that differs from other levels in the plurality of data structures;
    based on a density of inter-region references between the heap memory region and a first referring heap memory region of the plurality of referring heap memory regions, entering remembered set information for the first referring heap memory region into one data structure of the plurality of data structures that has a highest level of precision relative to other data structures;
    when the density of inter-region references between the heap memory region and the first referring heap memory region increases, entering additional remembered set information for the first referring heap memory region into a data structure with a next highest level of precision relative to the other data structures;
    reclaiming allocated, but unused memory in the heap memory region using a space incremental garbage collector based on the remembered set data structure,
        wherein the one data structure that has the highest level of precision is a sparse data structure including a fixed size entry for storing remembered set information for each referring heap memory region of the plurality of referring heap memory regions, wherein the first referring heap memory region comprises a plurality of cards, wherein a card of the plurality of cards comprises a first pointer from the first referring heap memory region into the heap memory region, wherein remembered set information for the first referring heap memory region comprises an identifier of the card, wherein the identifier is stored in the fixed size entry of the sparse data structure, wherein the space incremental garbage collector scans remembered set information for the first referring heap memory region in the sparse data structure to identify the first pointer for performing garbage collection in the heap memory region,
        wherein the data structure with the next highest level of precision is a fine data structure including a fixed number of fixed size entries for storing remembered set information for a fixed number of referring heap memory regions of the plurality of referring heap memory regions, and
        wherein the plurality of fixed-size data structures further comprises a coarse data structure including a plurality of entries corresponding to the plurality of referring heap memory regions;
    when the sparse data structure entry fills, removing remembered set information for the first referring heap memory region from the sparse data structure into a first fixed size entry of the fixed size entries of the fine data structure, wherein the space incremental garbage collector scans the first fixed size entry of the fine data structure for performing garbage collection in the heap memory region; and
    when the fixed number of the fixed size entries of the fine data structure is reached, removing remembered set information for the first referring heap memory region from the first fixed size entry of the fine data structure and marking a first entry of the plurality of entries in the coarse data structure, wherein the first entry corresponds to the first referring heap memory region, wherein the space incremental garbage collector identifies the first referring heap memory region based on the first entry in the coarse data structure and scans the first referring heap memory region to identify the first pointer for performing garbage collection in the heap memory region.

2. The method of claim 1, further comprising:
    moving remembered set information for the first referring heap memory region from the one data structure to another data structure of the plurality of data structures when the density of inter-region references between the heap memory region and the first referring heap memory region changes.

3. The method of claim 1, further comprising removing remembered set information for the first referring heap memory region from the one data structure that has the highest level of precision into the data structure with the next highest level of precision when the density of inter-region references between the heap memory region and the first referring heap memory region increases.

4. The method of claim 1 wherein the space incremental garbage collector performs a marking process that produces at least one marking bit array and wherein at least one of the plurality of data structures includes a bit array and wherein the method further comprises:
    identifying and removing stale remembered set entries by performing an intersection of a marking bit array and the data structure bit array.

5. The method of claim 1,
    wherein the first fixed size entry of the fine data structure includes a first bit array having a plurality of bits corresponding to the plurality of cards and wherein removing remembered set information for the first referring heap memory region into the first fixed size entry comprises marking a first bit of the plurality of bits of the first bit array corresponding to the card, and wherein the coarse data structure includes a second bit array and wherein each of the plurality of entries in the coarse data structure is a bit in the second bit array.

6. The method of claim 1, wherein the space incremental garbage collector performs a marking process that produces at least one marking bit array, wherein each of the fine data structure entries includes a bit array and wherein the method further comprises:
    identifying and removing stale remembered set entries by performing an intersection of a marking bit array and the fine data structure entry bit array.

7. The method of claim 6, wherein the coarse data structure comprises a bit array and wherein the method further comprises:
    identifying and removing stale remembered set entries by performing an intersection of a marking bit array and the coarse data structure bit array.

8. A computer system, comprising:
    a processor; and
    memory operatively coupled to the processor, the memory having instructions executable by the processor for performing:
        structuring a remembered set data structure for a plurality of referring heap memory regions of a heap memory region of the computer, the remembered set data structure having a plurality of fixed-size data structures, each of the plurality of fixed-size data structures having a representation of information stored therein and a level of precision that differs from other levels in the plurality of data structures;
        based on a density of inter-region references between the heap memory region and a first referring heap memory region of the plurality of referring heap memory regions, entering remembered set information for the first referring heap memory region into one data structure of the plurality of data structures that has a highest level of precision relative to other data structures;
        when the density of inter-region references between the heap memory region and the first referring heap memory region increases, entering additional remembered set information for the first referring heap memory region into a data structure with a next highest level of precision relative to the other data structures;
        reclaiming allocated, but unused memory in the heap memory region using a space incremental garbage collector based on the remembered set data structure,
            wherein the one data structure that has the highest level of precision comprises a sparse data structure including a fixed size entry for storing remembered set information for each referring heap memory region of the plurality of referring heap memory regions, wherein the first referring heap memory region comprises a plurality of cards, wherein a card of the plurality of cards comprises a first pointer from the first referring heap memory region into the heap memory region, wherein remembered set information for the first referring heap memory region comprises an identifier of the card, wherein the identifier is stored in the fixed size entry of the sparse data structure, wherein the space incremental garbage collector scans remembered set information for the first referring heap memory region in the sparse data structure to identify the first pointer for performing garbage collection in the heap memory region,
            wherein the data structure with the next highest level of precision is a fine data structure including a fixed number of fixed size entries for storing remembered set information for a fixed number of referring heap memory regions of the plurality of referring heap memory regions, and
            wherein the plurality of fixed-size data structures further comprises a coarse data structure including a plurality of entries corresponding to the plurality of referring heap memory regions;
        when the sparse data structure entry fills, removing remembered set information for the first referring heap memory region from the sparse data structure into a first fixed size entry of the fixed size entries of the fine data structure, wherein the space incremental garbage collector scans the first fixed size entry of the fine data structure for performing garbage collection in the heap memory region; and
        when the fixed number of the fixed size entries of the fine data structure is reached, removing remembered set information for the first referring heap memory region from the first fixed size entry of the fine data structure and marking a first entry of the plurality of entries in the coarse data structure, wherein the first entry corresponds to the first referring heap memory region, wherein the space incremental garbage collector identifies the first referring heap memory region based on the first entry in the coarse data structure and scans the first referring heap memory region to identify the first pointer for performing garbage collection in the heap memory region.

9. The computer system of claim 8, wherein the memory further comprises instructions executable by the processor for moving remembered set information for the first referring heap memory region from the one data structure to another data structure of the plurality of data structures when the density of inter-region references between the heap memory region and the first referring heap memory region changes.

10. The computer system of claim 8 wherein the space incremental garbage collector performs a marking process that produces at least one marking bit array and wherein at least one of the plurality of data structures includes a bit array and wherein the apparatus further comprises a mechanism that identifies and removes stale remembered set entries by performing an intersection of a marking bit array and the data structure bit array.

* * * * *